March 20, 1928.
H. J. CRINER
DRIVING MECHANISM FOR WASHING MACHINES
Filed Feb. 26, 1927
1,663,494
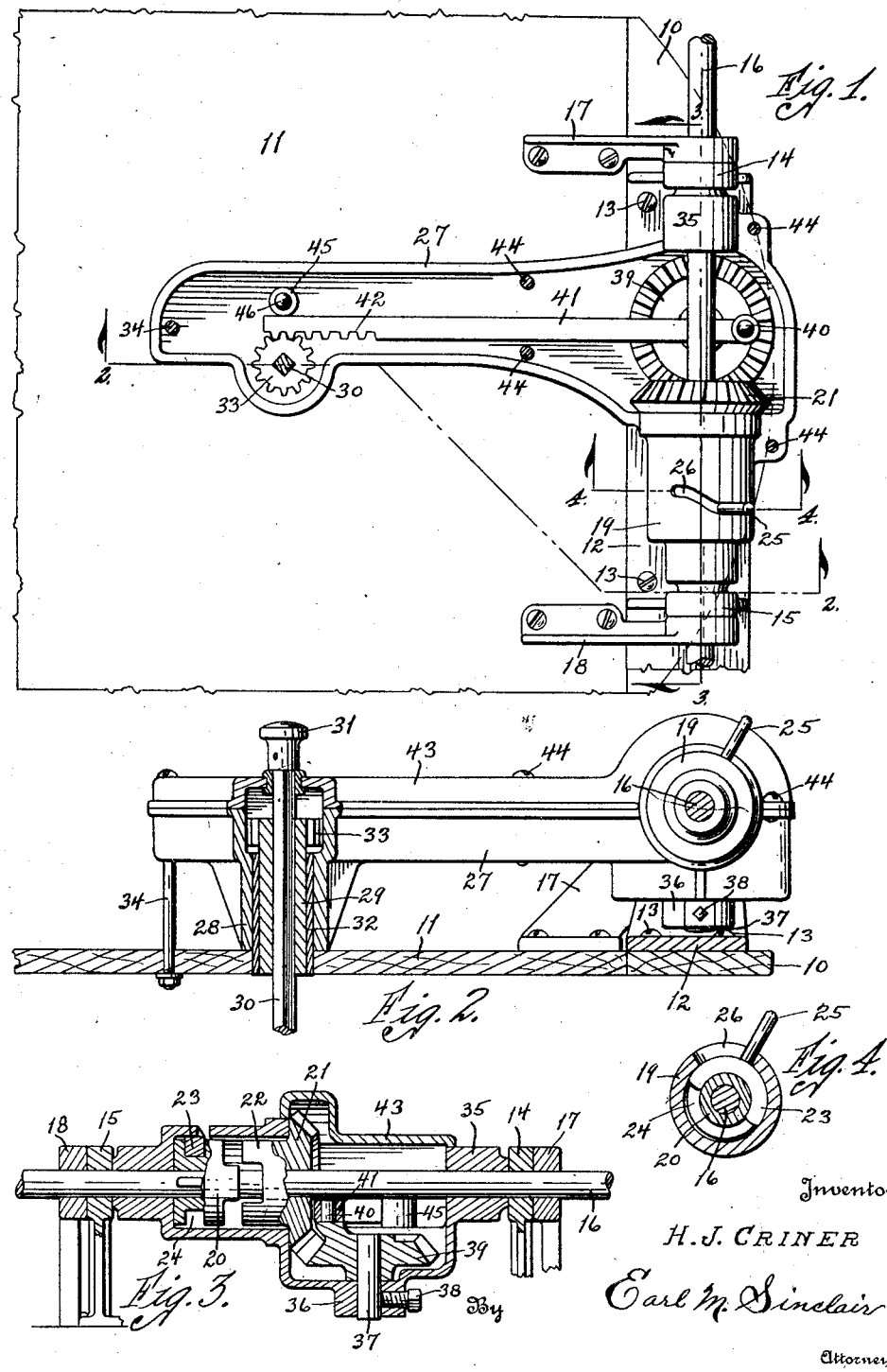
Inventor
H. J. CRINER
Earl M. Sinclair
Attorney Patented Mar. 20, 1928.

1,663,494

UNITED STATES PATENT OFFICE.

HARRY J. CRINER, OF BURLINGTON, IOWA, ASSIGNOR TO CLARINDA MANUFACTURING COMPANY, OF CLARINDA, IOWA, A CORPORATION OF IOWA.

DRIVING MECHANISM FOR WASHING MACHINES.

Application filed February 26, 1927. Serial No. 171,197.

The object of this invention is to provide an improved simplified gearing for washing machines involving the use of a reciprocating rack having a wrist pin connection to a bevel gear operated from the driving shaft, said rack engaging a pinion mounted on the agitator shaft.

A further object of the invention is to provide a gearing of the class described which is so arranged on the movable cover member of a washing machine that it may be swung through an arc with said cover member without the necessity of first disengaging any of the gear or driving parts.

With these and other objects in view, my invention consists in the construction, arrangement and combination of elements hereinafter set forth, pointed out in the claims and indicated by the accompanying drawing in which—

Fig. 1 is a plan view showing my improved gearing applied to a washing machine, the cover portion of the gear housing being removed.

Fig. 2 is a sectional side view taken on the line 2—2 of Fig. 1.

Fig. 3 is a section longitudinally of the driving shaft and taken on the line 3—3 of Fig. 1.

Fig. 4 is a section through the clutch controlling means on the line 4—4 of Fig. 1.

The mechanism is mounted on a suitable support such as the tub of a washing machine, the upper portion of said tub including a fixed member 10 and a movable or cover member 11. A base plate 12 is mounted on the fixed cover member 10 and secured thereto as by screws or bolts 13, said plate having bearings 14 and 15 formed on and rising therefrom. A driving shaft 16 is journaled for rotation in the bearings 14 and 15 and is adapted to be driven in any suitable manner as by an electric or gasoline engine motor (not shown). The driving shaft 16, in addition to furnishing power for the agitating means may be also employed for operating a clothes wringer (not shown). The movable cover member 11 is adapted to be swung through an arc on the axis of the shaft 16 for opening and closing the tub, by means of hinge members 17 and 18 fixed to said movable cover member and extending upwardly and outwardly over the fixed cover member 10 and having bearings at their ends on said shaft 16. A clutch housing 19 incloses a portion of the driving shaft 16 between the bearings 14 and 15, and within said housing is arranged a sliding clutch member 20 having a feathered connection to the driving shaft 16 whereby it rotates with said shaft and has a limited sliding movement thereon. A bevel gear 21 is loosely mounted on the driving shaft 16 and has an integral clutch member 22 extending within the housing 19 and adapted to be engaged at times by the sliding clutch member 20. A yoke 23 engages an annular groove 24 in the sliding clutch member and an operating lever 25 is formed on or fixed to said yoke and extends through an inclined slot 26 formed in the top of the housing, for manual operation of the clutch member 20 to throw it into or out of engagement with the clutch member 22 on the bevel gear.

A housing 27 is mounted above a portion of the movable cover member 11 and extends across the center thereof, and the main portion of said housing is elevated somewhat relative to said cover member and substantially parallel therewith. Near one end, the housing 27 is formed with a bearing portion 28 which extends downwardly into contact with the movable cover member 11, and in said bearing portion is journaled a cylindrical bearing block 29 vertically arranged and having an angular opening extending vertically therethrough in which is fitted and slidably mounted the agitating shaft 30 of the washing machine. The shaft 30 is presumed to carry at its lower end a suitable agitating device such as a dolly (not shown) and said shaft is rotatable with the bearing block 29 and vertically slidable therein in a common manner and having at its upper end a knob or head 31 to limit its downward movement. A suitable bushing 32 may be interposed between the bearing block 29 and the bearing surface of the bearing member 28. The upper end portion of the bearing block 29 extends within the body of the housing 27 and has formed thereon a pinion 33. That portion of the housing 27 near the center of the support is secured to the movable cover member 11 by suitable means including a bolt 34 extending through both of said members. The opposite end portion of the housing 27 extends beneath the driving shaft 16 and may be formed with a bearing 35 pivotally engaging said shaft. This end portion of the housing is formed at its bottom with a boss 36 and mounted vertically in said boss is a stud or spindle 37 which may be secured therein by means of a set screw 38. The stud or spindle 37 projects upwardly into the housing and a bevel gear 39 is rotatably mounted thereon and meshes with and is adapted to be driven at times by the bevel gear 21. On its upper face the horizontal bevel gear 39 is formed with a wrist pin 40 and a rack bar 41 is arranged longitudinally of and within the housing 27 and is pivoted at one end on said wrist pin 40. The opposite end portion of the rack bar 41 is formed as a rack 42 having operative engagement with the pinion 33. A cover member 43 is provided for the housing 27 which normally covers and incloses the gearing and operating members contained within the housing and these parts are all made of tight construction so that grease for lubricating purposes may be supplied thereto without danger of leaking. The cover member 43 is held in place by screws or the like 44 passing therethrough and engaging suitable seats in the housing.

In practical use the driving shaft 16 is operated by any suitable means provided therefor and when it is desired to operate the agitating means, the lever 25 is manually moved to such position as to carry the sliding clutch member 20 into operative engagement with the clutch member 22 on the vertical bevel gear 21 thus causing said bevel gear to be rotated with the shaft. This operation causes a rotation of the horizontal bevel gear 39 on the stud 37, thus causing a reciprocation of the rack bar 41 and a consequent oscillation of the pinion 33, bearing block 29, shaft 31, and agitating devices. As the housing 27 has no connection to the rigid portions such as 10 and 12 of the support but does have a bearing on the shaft 16, it may oscillate on the axis of said shaft when the cover member 11 is moved to and from open position. None of the operating parts need be disconnected for opening or closing the cover member 11, as the rack 42 may remain in mesh with the pinion 33 and the horizontal bevel gear 39 may travel on the vertical bevel gear 21 in such movement.

This construction provides a very simple and efficient driving mechanism for power washing machines and there are very few moving parts to wear or get out of order and the whole mechanism is cheap and economical to manufacture and easy to use by unskilled persons. The moving parts are all inclosed, as the vertical bevel gear 21 projects within the housing 27 and its cover member 43, so that the danger to unskilled operators is reduced to a minimum.

A backing roller 45 is pivoted on a stud 46 or bolt carried by the housing 27 and said roller engages the rear face of the rack bar 41 in opposition to the pinion 33 and serves to hold the rack in mesh with said pinion.

I claim as my invention:

1. The combination with a support having a fixed member and a movable member, of a driving shaft arranged for rotation on said fixed member, hinge members fixed to the movable support and having bearings on said driving shaft, a housing fixed to said movable support and extending across and at right angles to said driving shaft, a bearing block arranged for rotation in said housing, an agitator shaft arranged for rotation with and for sliding movement relative to said bearing block and extending through said movable support, a bevel gear arranged for rotation in said housing, a second bevel gear feathered on said driving shaft and adapted to be brought into operative engagement with the first mentioned bevel gear, the first mentioned bevel gear having a wrist pin on its face, a rack bar pivoted on said wrist pin, and a pinion on said bearing block meshing with and adapted to be operated by said rack bar, the housing and members connected therewith being movable through an arc with said movable support on the axis of said driving shaft.

2. The combination with a fixed support and a movable support adapted for swinging movement relative to the fixed support, of a driving shaft journaled on the fixed support, hinge members fixed to the movable support and extending upwardly and laterally and having bearings on said driving shaft, a housing having one end portion attached to the movable support and the opposite end portion extending across the driving shaft, a spindle carried by said housing, a bevel gear rotatably mounted on said spindle and having a wrist pin on its face, a second bevel gear loosely mounted on said driving shaft in mesh with the first mentioned bevel gear, a clutch member feathered on said driving shaft and adapted for operative engagement with the second mentioned bevel gear at times, a rack bar pivoted at one end on said wrist pin, a pinion in said housing meshing with the rack bar, and an agitating member adapted to be rotated by said pinion and extending through said movable support, the movable support, housing, rack bar, and first mentioned bevel gear being adapted for oscillation through an arc on the axis of the driving shaft without disengagement of any of the parts thereof.

3. The combination with a fixed support and a movable support adapted for swinging movement relative to the fixed support, of a driving shaft journaled on the fixed support, hinge members fixed to the movable support and extending upwardly and laterally and having bearings on said driving shaft, a housing having one end portion attached to the movable support and the opposite end portion extending across the driving shaft, a spindle carried by said housing, a bevel gear rotatably mounted on said spindle and having a wrist pin on its face, a second bevel gear slidably mounted on said driving shaft in mesh with the first mentioned bevel gear, a clutch member feathered on said driving shaft and adapted for operative engagement with the second mentioned bevel gear at times, a rack bar pivoted at one end on said wrist pin, a pinion in said housing meshing with the rack bar, a roller pivotally mounted in said housing and engaging the rack bar in opposition to said pinion, and an agitating member adapted to be rotated by said pinion and extending through said movable support, the movable support, housing, rack bar, and first mentioned bevel gear being adapted for oscillation through an arc on the axis of the driving shaft without disengagement of any of the parts thereof.

HARRY J. CRINER.